UNITED STATES PATENT OFFICE.

GUSTAV TEICHNER, OF VIENNA, AUSTRIA.

HYDROGENATING CATALYZER.

1,427,037.  Specification of Letters Patent.  Patented Aug. 22, 1922.

No Drawing.  Application filed September 29, 1920. Serial No. 413,646.

*To all whom it may concern:*

Be it known that I, GUSTAV TEICHNER, a citizen of the Republic of Austria, and residing at Vienna, Austria, have invented certain new and useful Improvements in Hydrogenating Catalyzers, for which I have filed applications in Germany, November 10, 1916, Hungary, November 8, 1917, Austria, November 10, 1917, and of which the following is a specification.

This invention relates to catalyzers and process of making same, adapted for the hydrogenation of fats, fatty oils, fatty acids as well as for other bodies capable of taking up hydrogen under the catalytic process and relates especially to nickel catalyzer.

The nickel catalyst which forms the subject matter of this invention is made especially by suitably precipitating from a solution of a nickel salt amorphous noncoherent nickel carbonate, drying and grinding the precipitate, and then by cautious reduction at a low temperature converting it only superficially into metal. There is thus obtained a nickel catalyst of high degree of fineness and activity.

The superiority of this catalyst as compared with known nickel catalysts is due to the small size of the individual particles and to the fact that each particle contains an unreduced core which serves as a carrier for the metal and thus prevents the latter from collecting together and separating in flocks. If the reduction is driven further so that the inner parts of the particles are converted into metal the activity of the catalyst diminishes considerably, since the particles owing to their increased specific gravity lose their tendency to float. The smaller the particles the further can the reduction be carried without fear that when the catalyst is used for hydrogenating liquids it will separate in flocks. The progress of the reduction process may be controlled by drawing little samples of the catalyst, mixing them with oil and observing the mixture with the microscope. The particles which originally are clear and transparent grow black and nontransparent by the formation of the metallic coat. By exercising a slight pressure on the covering glass of the microscopic slide the particles are split up and if they contain still an unreduced core, there appear clear, transparent particles among black ones. As long as such a transparent core can be observed, the catalyst corresponds to the essential conditions of this process. The most suitable thickness of the metallic coat may be established in every case, by trying empirically which temperature and duration of reduction gives the best results.

The fineness of the nickel carbonate depends on the conditions of precipitation. All forms may be obtained from heavy, hard, dark-green, glassy particles to light, loose, nearly white, earthy particles. It appears that the originally small amorphous particles of carbonate have a tendency to cohere together more or less according to the conditions of precipitation. Contrary to expectation, the mode of drying is of little importance. A product, the particles of which once adhere together can never again be reduced to the fineness of the original amorphous particles by subsequent grinding.

For the present purpose, therefore, it is essential to conduct the precipitation so that subsequent cohesion of the particles is impossible. This may be achieved by high carbonic acid concentration in the solution to be precipitated, that is to say by precipitation at not too high a temperature and best with a bi-carbonate in the cold. The extremely loose nickel carbonate obtained by drying is ground and then treated with hydrogen at a temperature not higher than 300° C. preferably at about 220° C until there is superficial formation of metal (carbonyl reaction), and then, with exclusion of air, the product is mixed with the liquid to be hydrogenated. Thus the process is very simple, neither costly chemicals, nor catalyst carriers being necessary. The reduction temperature is low and catalysts are obtained of such high activity that generally only a fraction of the quantity of catalyst usually necessary is requisite for producing a like effect.

The catalysts obtained are suitable for hydrogenating the most different organic liquids, especially fatty oils and free fatty acids. The latter is somewhat surprising since hot fatty acids easily dissolve nickel carbonate and because fatty acids are less viscous than glycerides, and therefore, as is shown by experience, the catalyst is much more readily deposited in the free fatty acids; the light unreduced core must therefore be the more capable or have a more marked tendency to keep suspended or floated the heavy superficial metal coating in order that the particles of the catalyst may remain in suspension. The case of the fatty acids shows best the favourable effect of the combination of the protecting metal coat with the carrying core.

Instead of the carbonate, finely subdivided hydroxide may be used, such as is obtained particularly by precipitation with ammonia. But generally the carbonate is more advantageous.

The following example illustrates the invention:

A solution of 300 grams of sodium bicarbonate in 3600 cc. of water is poured into a solution of 500 grams of crystallized nickel sulphate in 2500 cc. of water at the room temperature; after half an hour the precipitate is filtered, shaken four times with 1 litre of water, again filtered and finally dried at 100° C. There is thus obtained a non-coherent, loose nearly white mass of which 100 cc. measured loosely in a measuring flask, only weighs 20 grams or less (commercial nickel carbonate under like conditions generally weighs from 60–120 grams). The ground product is treated with hydrogen at 220° C. for 2 hours with suitable movement, and is then mixed with exclusion of air with 400 times its quantity of maize oil. The mixture when hydrogenated in the usual manner at 170–200° C. shows after 2 hours a melting point of 46° C. or higher. Obviously, the hydrogenation conditions can be varied and a smaller proportion of catalyst may be used.

I claim:

1. The process of preparing a catalyst adapted for hydrogenating organic substances which comprises reducing in a dry state a precipitated non-coherent, loose, amorphous compound of nickel at such a low temperature that cohesion or slagging of the particles, is avoided while leaving the interior of each particle unreduced.

2. The process of preparing a catalyst adapted for hydrogenating unsaturated fatty material which comprises subjecting in a dry state a precipitated non-coherent, amorphous compound of nickel to the action of a reducing gas at a temperature not higher than 300° C. until there is superficial formation of metal while leaving the interior of such particle unreduced.

3. The process of making a catalyzer adapted for hydrogenating the unsaturated portions of fatty material which comprises reducing in a dry state precipitated nickel carbonate at a temperature not higher than 300° superficially into metal while leaving the interior of the mass unreduced.

4. The process of preparing a catalyst adapted for hydrogenating unsaturated fatty material which comprises precipitating from a solution of a nickel salt amorphous non-coherent nickel carbonate, drying and grinding the precipitate and then by reduction at a temperature not higher than 300° converting the same only superficially into metal.

5. The process of making a catalyzer adapted for hydrogenating the unsaturated constituents of fatty oils which comprises precipitating from a nickel salt solution at high carbonic acid concentration amorphous non-coherent nickel carbonate, drying and grinding the precipitate and then treating the same with hydrogen at a temperature not higher than 300° until there is superficial formation of metal.

6. The process of preparing a catalyst adapted for hydrogenating unsaturated constituents of fatty oils which comprises precipitating from a nickel salt solution with a bi-carbonate in the cold amorphous non-coherent nickel carbonate, drying and grinding the precipitate and then treating the same with hydrogen at a temperature not higher than 300° until there is superficial formation of metal.

7. The process of preparing a catalyst adapted for hydrogenating unsaturated fatty material which comprises precipitating from a solution of a nickel salt with a bi-carbonate in the cold non-coherent loose nickel carbonate, drying and grinding the precipitate and then treating the same with hydrogen at about 220° C. until there is superficial formation of metal.

8. The process of preparing a catalyst adapted for hydrogenating unsaturated fatty material which comprises pouring a solution of 360 grams of sodium bicarbonate in 3600 cc. of water into a solution of 500 grams of crystallized nickel sulphate in 2500 cc. of water, filtering the precipitate, shaking it with water, filtering again and finally drying the precipitate at 100° C. and grinding it and then treating the thus obtained non-coherent, loose mass with hydrogen at 220° C. with suitable movement.

9. A catalyst adapted for oil hardening consisting of an unreduced core of non-coherent, finely subdivided nickel carbonate with a protecting coat of pure nickel metal.

10. A catalytic body consisting of an unreduced core of precipitated, dried and ground nickel carbonate coated superficially with a skin of pure nickel metal.

In testimony whereof I have affixed my signature.

GUSTAV TEICHNER.